No. 773,208. PATENTED OCT. 25, 1904.
K. P. KETELSEN.
MACHINE FOR RAKING HAY.
APPLICATION FILED SEPT. 16, 1903.
NO MODEL.

No. 773,208. Patented October 25, 1904.

UNITED STATES PATENT OFFICE.

KETEL PETER KETELSEN, OF WANGE, GERMANY.

MACHINE FOR RAKING HAY.

SPECIFICATION forming part of Letters Patent No. 773,208, dated October 25, 1904.

Application filed September 16, 1903. Serial No. 173,476. (No model.)

*To all whom it may concern:*

Be it known that I, KETEL PETER KETELSEN, a subject of the Emperor of Germany, residing at Wange, near Emmesbüll, Germany, have invented certain new and useful Improvements in Machines for Raking Hay; and I do hereby declare the following to be a full, clear, and exact description of the invention, such as will enable others skilled in the art to which it appertains to make and use the same.

The present invention relates to a machine which may be used to turn the hay or to rake the hay together ready to be loaded into wagons, thus doing the work for which heretofore two separate machines had to be employed. To attain this object, the rake is composed of a number of smaller rakes which are revolubly secured to a cross-beam on wheels. These smaller rakes may be adjusted on the cross-beam at an angle of forty-five degrees when the machine is to be used for turning over the hay, and in this instance the cross-beam is made to travel transversely. When the machine is used for raking the hay together, the cross-beam is placed at an angle of forty-five degrees to the line of travel and the individual rakes are adjusted on the beam in line—that is to say, parallel to the cross-beam—forming one single rake.

Figure 1:
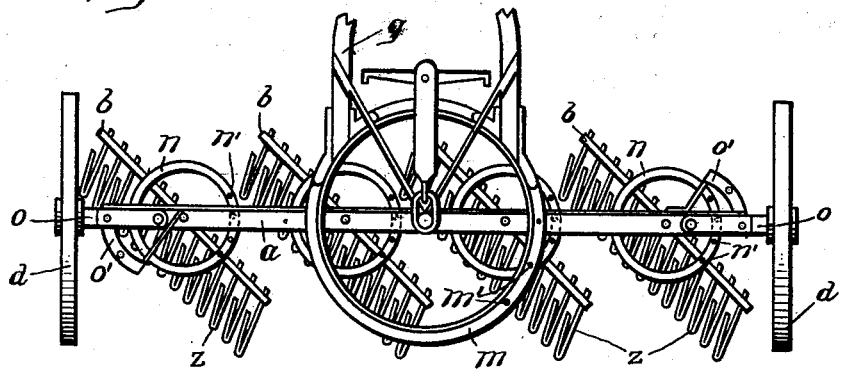
Figure 2:
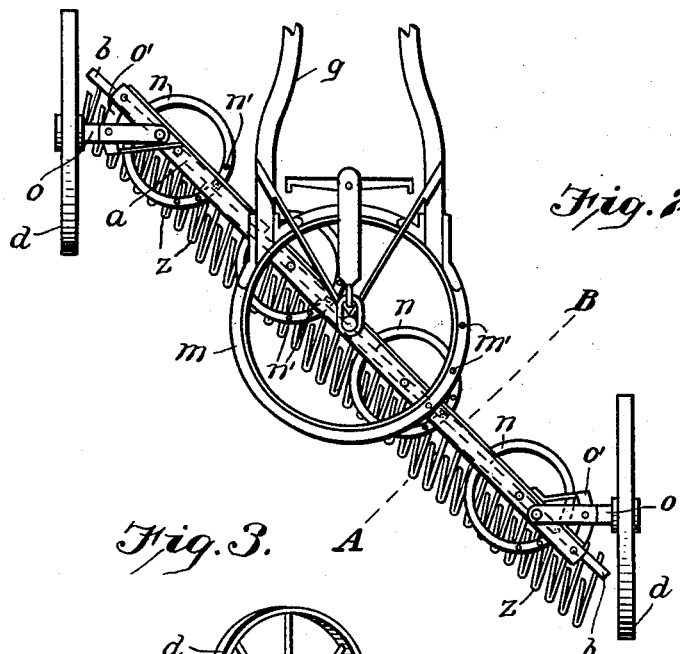
Figure 3:
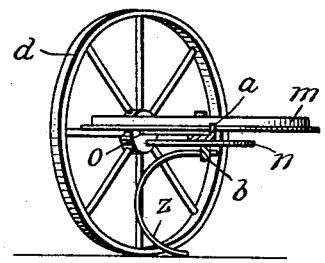

In the accompanying drawings, forming part of this specification, Figure 1 shows the machine in plan view, the rake being adjusted for turning over the hay. Fig. 2 is a plan view of the machine in position for raking the hay together. Fig. 3 is a cross-section on line A B of Fig. 2.

A cross-beam $a$ is secured to a pole or shafts $g$ by the king-bolt and a fifth-wheel $m$ in a manner which admits of adjusting the same at right angles to the shafts or at any other angle, especially at forty-five degrees to said shafts. To this end the ring $m$, preferably made of angle-iron, has a number of holes $m'$ in its flange, being in the horizontal plane adapted to receive pins or pegs, which pass with their lower ends into corresponding holes in the beam $a$. Rings $n$ are rigidly secured to the under side of the beam $a$ in a number equal to the rakes to be employed, and under these rings $n$ the beams $b$ of the individual rakes are pivoted to the beam $a$ in the center of the rings $n$, which are used to guide the beams $b$ and to secure and adjust the same at any desired angle. The rings $n$ are provided with holes $n'$, similar to the holes $m'$, as described with respect to the ring or fifth-wheel $m$. Pegs are used in the holes $n'$ to adjust the beams $b$ at the desired angle. The wheels $d$ of the machine are running on spindles $o$, which are pivotally connected to the ends of beam $a$, so that they can be secured in line with the beam $a$, as shown in Fig. 1, or at an angle, as shown in Fig. 2. To this end a plate provided with suitable holes may be secured to the beam, or a sector-strap $o'$, as shown in the drawings, may be used having holes for pegs to secure the spindles $o$ in either of the positions as stated.

The prongs or teeth $z$ of the rakes are curved, as shown, and are turned obliquely to the direction of traveling, so that the ends point toward the adjacent prong. In operation when adjusted as shown in Fig. 1 the hay is pushed to the right by each individual rake and is at the same time turned over, as the prongs pointing to the left act somewhat in the way of a plow and turn the hay, leaving the lower part on the top when the machine has passed or when the hay is left free at the end of each individual rake.

When adjusted as shown in Fig. 2, the rakes $b$ being in line with the beam $a$, the hay is gathered by the machine and gradually brought to the right side, where the hay is left in a strip ready to be taken up by forks for the wagon. The hay treated by the new machine is not so much exposed to the dragging on the ground as when raked together in the ordinary way, because the prongs of the rakes give the hay a turning motion and move it sidewise without tearing it. Also the seeds remain in the hay and are not shaken out during the treatment.

Having thus described my invention, I claim—

A hay raking and turning machine comprising a beam $a$ with wheels at the ends having their axles pivotally connected to the beam ends capable of swinging in a horizontal plane passing through the beam $a$ and provided with means to adjust said axles in line or at an angle at will, said beam carrying individual rake-beams on pivots and carrying concentrically to these pivots rings $n$ secured to the under side of beam $a$ and situated between said beam and the individual rake-beams, said rings $n$ having holes $n'$, adapted to receive pegs projecting from holes in the beam $a$, to secure the rakes at any desirable angle substantially as described and for the purpose set forth.

In testimony whereof I affix my signature.

KETEL PETER KETELSEN.

In presence of—
  J. HERMES,
  JULIUS RÖPKE.